United States Patent
Forster et al.

(10) Patent No.: US 11,283,380 B2
(45) Date of Patent: Mar. 22, 2022

(54) METHOD AND DEVICE FOR DETERMINING THE ROTATIONAL SPEED AND THE ANGLE OF ROTATION OF A MOTOR SHAFT OF A MECHANICALLY COMMUTATED DC MOTOR

(71) Applicant: Conti Temic Microelectronic GmbH, Nuremberg (DE)

(72) Inventors: Josef Forster, Munich (DE); Christian Gruber, Munich (DE); Norbert Seuling, Munich (DE); Shobhit Sharma, Munich (DE)

(73) Assignee: Conti Temic Microelectronic GmbH

( * ) Notice: Subject to any disclaimer, the term of this patent is extended or adjusted under 35 U.S.C. 154(b) by 0 days.

(21) Appl. No.: 16/944,409

(22) Filed: Jul. 31, 2020

(65) Prior Publication Data

US 2021/0044228 A1 Feb. 11, 2021

(30) Foreign Application Priority Data

Aug. 6, 2019 (DE) .................. 10 2019 211 800.3

(51) Int. Cl.
*H02H 3/04* (2006.01)
*H02P 7/00* (2016.01)
*H02P 6/34* (2016.01)

(52) U.S. Cl.
CPC .............. *H02P 7/0094* (2013.01); *H02P 6/34* (2016.02)

(58) Field of Classification Search
CPC ........... H02P 7/0094; H02P 6/34; H02P 23/12
See application file for complete search history.

(56) References Cited

U.S. PATENT DOCUMENTS

| 5,325,026 A | 6/1994 | Lyons et al. |
| 6,144,179 A | 11/2000 | Kessler et al. |
| 7,064,509 B1 | 6/2006 | Fu et al. |
| 7,276,877 B2 | 10/2007 | Qiu et al. |

(Continued)

FOREIGN PATENT DOCUMENTS

| CN | 102629847 B | 8/2014 |
| CN | 107769636 A | 3/2018 |

(Continued)

*Primary Examiner* — Karen Masih
(74) *Attorney, Agent, or Firm* — RatnerPrestia

(57) ABSTRACT

A method for determining the rotational speed and the angle of rotation of a motor shaft of a mechanically commutated DC motor from the measured progression of time of the ripple in the motor current and in the motor terminal voltage occurring during the commutation. A motor state model of the DC motor, to which the measured motor terminal voltage and the measured motor current, an estimated load torque, an estimated rotational speed and an estimated angle of rotation of the DC motor are supplied to a Kalman filter as input variables. By running the motor state model, the Kalman filter provides an estimated current, an adjusted rotational speed and an adjusted angle of rotation of the DC motor as output variables. From the ripple in the measured motor current and the rotational speed, adjusted by the Kalman filter, a ripple detection unit determines the commutation times and, from the latter, derives an estimated rotational speed and an estimated angle of rotation of the DC motor and provides same to the Kalman filter as the input variables.

9 Claims, 2 Drawing Sheets

(56) References Cited

U.S. PATENT DOCUMENTS

| | | |
|---|---|---|
| 7,443,128 B2 | 10/2008 | Bieler et al. |
| 7,659,685 B2 | 2/2010 | Cesario et al. |
| 7,668,690 B2 | 2/2010 | Schneider et al. |
| 8,427,093 B2 | 4/2013 | Park |
| 9,046,543 B2 | 6/2015 | Atay |
| 9,093,940 B2 | 7/2015 | Xu et al. |
| 9,441,943 B2 | 9/2016 | Dib |
| 9,772,199 B2 | 9/2017 | Morawek |
| 9,966,891 B2 | 5/2018 | Wang et al. |
| 10,742,143 B2 * | 8/2020 | Roemmelmayer ....... H02P 6/20 |
| 2016/0156294 A1 | 6/2016 | Heo et al. |
| 2018/0246489 A1 | 8/2018 | Yamamoto et al. |

FOREIGN PATENT DOCUMENTS

| | | |
|---|---|---|
| CN | 109412488 A | 3/2019 |
| DE | 4115338 A1 | 11/1992 |
| DE | 102094056410 A1 | 5/2006 |
| EP | 1768250 A2 | 3/2007 |
| EP | 1659683 B1 | 2/2008 |
| EP | 2109211 A1 | 10/2009 |
| EP | 1879289 B1 | 2/2012 |
| JP | 2003106356 A | 4/2003 |
| JP | 2003153571 A | 5/2003 |
| JP | 2094080921 A | 3/2004 |

* cited by examiner

METHOD AND DEVICE FOR DETERMINING THE ROTATIONAL SPEED AND THE ANGLE OF ROTATION OF A MOTOR SHAFT OF A MECHANICALLY COMMUTATED DC MOTOR

CROSS REFERENCE TO RELATED APPLICATIONS

This application claims priority to German Patent Application No. 10 2019 211 800.3, filed Aug. 6, 2019, the contents of such applications being incorporated by reference herein.

FIELD OF THE INVENTION

The invention relates to a method and a device for determining the rotational speed and the angle of rotation of a motor shaft of a mechanically commutated DC motor from the measured progression of time of the ripple in the motor current and in the motor terminal voltage occurring during the commutation.

BACKGROUND OF THE INVENTION

Many applications for adjusting or positioning an actuator, such as, for example, a window opener or a seat in a motor vehicle, are based on mechanically commutated DC motors. These applications require a precise estimation of the motor rotational speed and of the motor position, which can be determined from the angle of rotation. Motor rotational speed and position can be determined, for example, using position sensors, such as, for example, Hall sensors. However, the use of sensors causes undesirable costs which, as far as possible, should be avoided, in particular in high-volume applications.

DE 197 29 238 C1, incorporated herein by reference, describes a sensor-free position identification method which is based on evaluating the measured progression of time of the motor current ripple occurring during the commutation. The ripple can be detected and evaluated as a measure for the rotational speed of the mechanically commutated DC motor. Such ripple counters calculate the angle of rotation (and therefore the position) by detecting and counting current ripples which are caused by the commutation of the DC motor. The commutation and the subsequent production of ripples depend on various internal and external factors, such as, for example, brush and commutator geometry, brush and commutator resistors, ambient temperature and the like. The simple counting of ripples for estimating the position may therefore lead, under unfavorable circumstances, to erroneous results, in particular if the DC motor is exposed to frequent load changes or the motor shaft of the DC motor is blocked, which becomes noticeable in a sudden reduction in the motor rotational speed.

U.S. Pat. No. 9,046,543 B2, incorporated herein by reference, discloses a method for determining the rotational speed of a mechanically commutated DC motor using Fast Fourier Transformation (FFT), wherein the rotational speed as a result of the FFT is supplied to a Kalman filter which processes said rotational speed in a motor state model. A disadvantage of the described procedure consists in that the FFT requires very high computing power.

SUMMARY OF THE INVENTION

An aspect of the invention is a method and a device which permit a functionally improved determination of the rotational speed and of the angle of rotation of the motor shaft of a mechanically commutated DC motor.

A first aspect proposes a method for determining the rotational speed and the angle of rotation of a motor shaft of a mechanically commutated DC motor from the measured (in real time) progression of time of the ripple in the motor current and in the motor terminal voltage occurring during the commutation. In this method, a Kalman filter, which comprises a motor state model of the DC motor, is supplied with the measured motor terminal voltage and the measured motor current, an estimated load torque, an estimated rotational speed and an estimated angle of rotation of the DC motor as input variables. By running the motor state model, the Kalman filter provides an estimated current, an adjusted rotational speed and an adjusted angle of rotation of the DC motor as output variables. Furthermore, from the ripple in the measured motor current and the rotational speed, adjusted by the Kalman filter, as input variables, a ripple detection unit determines the commutation times and, from the latter, derives an estimated rotational speed and an estimated angle of rotation of the DC motor and provides same to the Kalman filter as input variables.

According to an aspect of the invention, in order to provide a more precise rotational speed and/or an angle of rotation of the motor shaft, it is provided that the output of the Kalman filter and the ripple detection unit are mutually adjusted for each calculation step. This leads to an improved estimation of the motor position and rotational speed.

Expediently, the rotational speed adjusted by the Kalman filter and the adjusted angle of rotation of the DC motor are supplied as output variables to an evaluation unit for further processing. The evaluation unit can use the adjusted rotational speed and the adjusted angle of rotation, for example, for driving the DC motor. The DC motor can be used, for example, for a window opener or the seat of a motor vehicle. Other applications in which a highly precise driving of the DC motor is required are, of course, also possible.

In a further expedient refinement, the Kalman filter compares one or more of the states estimated by the motor state model of current and/or adjusted rotational speed and/or the adjusted angle of rotation of the DC motor with the values determined by measurement and estimation by the ripple detection unit and, when errors are ascertained, filters same by forming a weighted average value of estimated and observed values. In other words, current and/or the adjusted rotational speed and/or the motor angle of rotation are filtered. The output variables of the Kalman filter are therefore as precise as possible and constitute the greatest possible approximation to the actual state of the monitored mechanically commutated DC motor and of the application associated therewith.

In a further expedient refinement, the estimated load torque is determined by the load estimation unit from the measured motor terminal voltage, the measured motor current and from motor parameters of the DC motor that are stored in the load estimation unit. The causes of the load torque in the actual application arise from friction, rigidity and/or losses of the system and cannot be measured in practice without additional sensors. Since the Kalman filter requires the load torque for modeling the motor state model, the load estimation unit provides a torque calculation model which can estimate the load torque from the measured current and the measured motor terminal voltage using the stored motor parameters. Various embodiments of load estimation units of this kind are known from the prior art.

In a further expedient refinement, the ripple detection unit determines the commutation times from the adjusted rotational speed provided by the Kalman filter and processes said times as a reference if the ripples observed in the wave shape of the measured motor current have a dominant frequency or if the ripples observed in the wave shape of the measured motor current have two or more ripple frequencies. Ripples observed in the wave shape of the measured motor current may have a dominant frequency if the mechanically commutated DC motor is a two-pole motor. Two or more ripple frequencies may be present in the wave shape of the measured motor current if the mechanically commutated DC motor is a four-pole motor or if the mechanically commutated DC motor is a quadripole with an asymmetric magnetic field which has two magnets of identical polarity, wherein virtual poles of the other polarity are formed between the two magnets. Motors of this kind have the advantage of lower costs since a four-pole motor can be "simulated" by the use of just two physical magnets.

In a further expedient refinement, the Kalman filter, the ripple detection unit and the load estimation unit are implemented as programs and are executed by a computing unit. This permits simple implementation of the proposed method on a commercially available microcontroller.

A second aspect of the present invention proposes a computer program product which can be directly loaded into the internal memory of a digital computing unit and comprises software code sections which are used to carry out the steps of the method described here when the product runs on the computing unit. The computer program product can be embodied in the form of a data carrier, such as, for example, a CD-ROM, a DVD, a USB memory stick or a memory card. The computer program product is also in the form of a signal which can be loaded via a wireless or wired network.

A third aspect of the present invention proposes a device for determining the rotational speed and/or the angle of rotation of a motor shaft of a mechanically commutated DC motor from the measured progression of time of the ripple in the motor current and in the motor terminal voltage occurring during the commutation. The device is designed to supply a Kalman filter, which comprises a motor state model of the DC motor, with the measured motor terminal voltage and the measured motor current, an estimated load torque, an estimated rotational speed and an estimated angle of rotation of the DC motor as input variables. By running the motor state model, the Kalman filter then provides an estimated current, an adjusted rotational speed and an adjusted angle of rotation of the DC motor as output variables. The device is furthermore designed to determine with a ripple detection unit, from the ripple in the motor current and the rotational speed, adjusted by the Kalman filter, as input variables, the commutation times and, from the latter, to derive an estimated rotational speed and an estimated angle of rotation of the DC motor and to provide same to the Kalman filter as input variables. The improved estimation of the motor angle of rotation or motor position and/or rotational speed is produced in the device mentioned in that the outputs of the Kalman filter and of the ripple identification function are mutually adjusted for each calculation step of the control. The device furthermore has further advantages of the above-described method.

BRIEF DESCRIPTION OF THE DRAWINGS

An aspect of the invention is described in greater detail below with reference to an exemplary embodiment in the drawing.

DETAILED DESCRIPTION OF THE PREFERRED EMBODIMENTS

Figure 1:
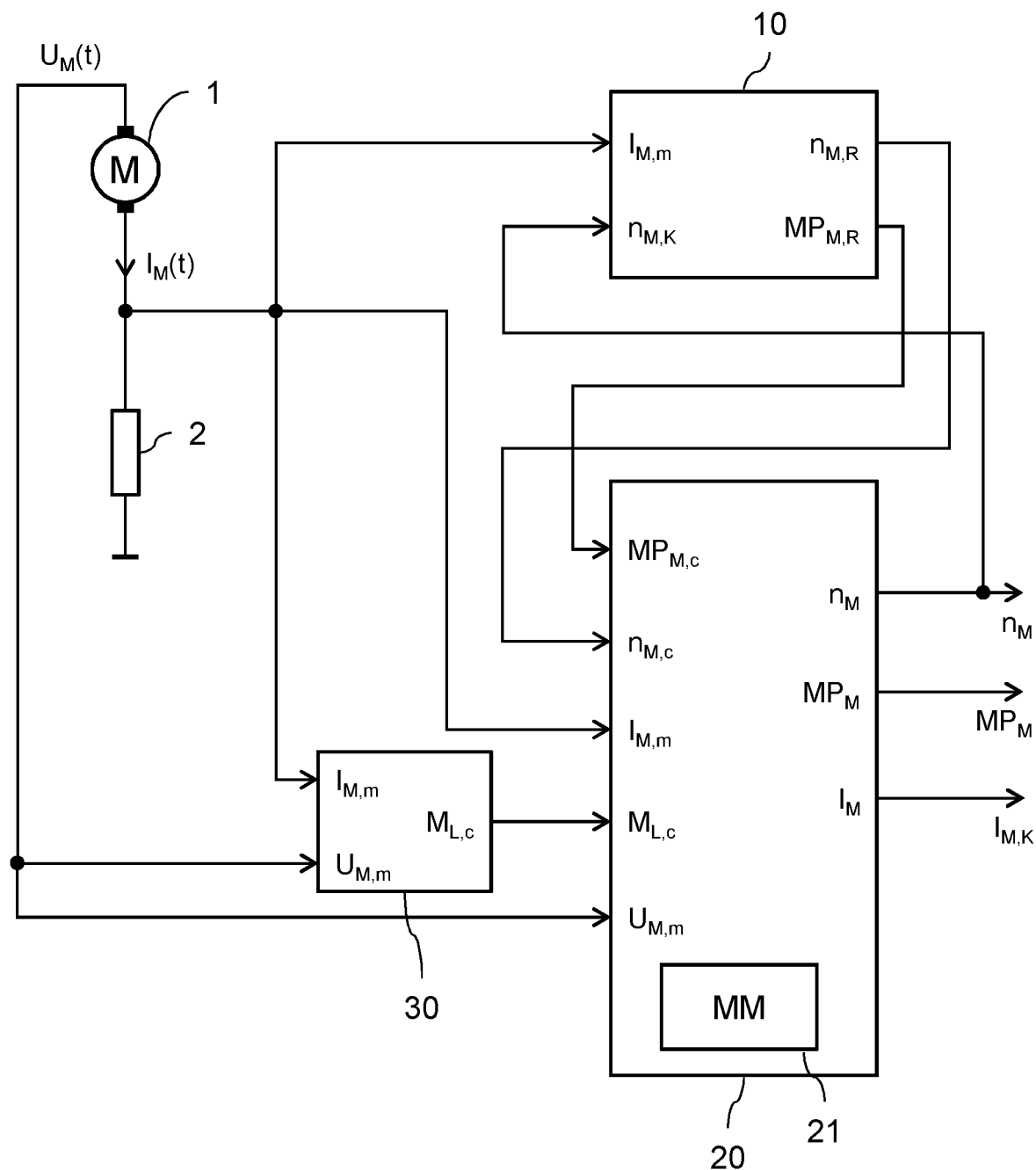
FIG. 1 shows a schematic illustration of the components required for implementing the method according to an aspect of the invention.
Figure 2:
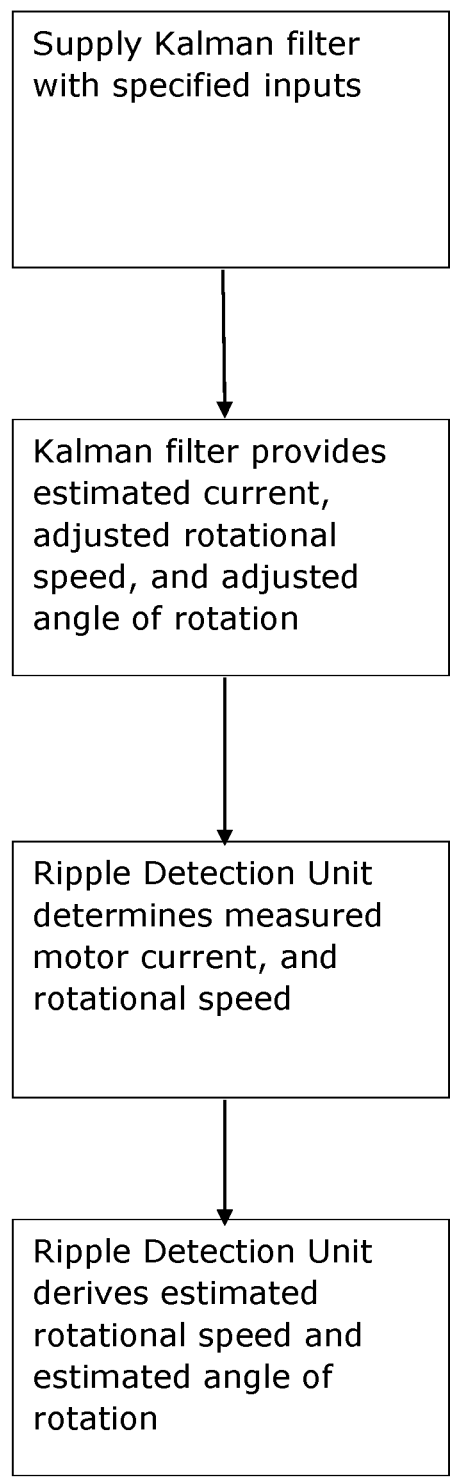
FIG. 2 is a flow chart illustrating an aspect of the invention.

FIG. 1 shows a schematic block circuit diagram of an arrangement for carrying out the method (See FIG. 2). A series connection of a mechanically commutated DC motor 1 and a measuring resistor 2 is connected between a supply potential and a reference potential. The progression in time of a motor terminal voltage $U_M(t)$ and a motor current $I_M(t)$ are detected via sensors (not illustrated specifically). The measured motor current is supplied to a ripple detection unit 10, a Kalman filter 20 and a load estimation unit 30 and is denoted by $I_{M,m}$. The measured motor terminal voltage UM is supplied to the Kalman filter 20 and to the load estimation unit 30 and is denoted by $U_{M,m}$. Since the variables mentioned are in each case measured variables, they are provided with the additional index "m" at respective inputs of said units—ripple detection unit 10, Kalman filter 20 and load estimation unit 30.

The ripple detection unit 10, the Kalman filter 20 and the load estimation unit 30 can be implemented as programs on a computing unit, for example a microcontroller.

The Kalman filter 20 comprises a motor state model 21 of the DC motor 1. For the running of the motor state model 21, which can be implemented, for example, as in DE 197 29 238 C1 mentioned at the beginning, it requires, in addition to the measured motor terminal voltage $U_{M,m}$ and the measured motor current $I_{M,m}$, an estimated load torque $M_{L,c}$, an estimated rotational speed $n_{M,c}$ of the DC motor 1 and an estimated angle of rotation $MP_{M,C}$ of the DC motor 1 as input variables, wherein a position (motor position) of the DC motor 1 can be determined from the angle of rotation on the basis of direct proportionality. Estimated variables are provided with the additional index "c" at respective inputs. The Kalman filter estimates the states of motor current $I_M$, rotational speed $n_M$ and motor angle of rotation $MP_M$ of the DC motor 1 by running an observer, which implements the motor state model 21, and compares the output states with the values determined by measurement and estimation. In the process, the rotational speed $n_M$ and the motor angle of rotation $MP_M$ of the Kalman filter are adjusted by the observer and are therefore also referred to as adjusted variables. The motor current $I_{M,K}$ estimated by the Kalman filter 20 is not required for the further function and therefore also does not necessarily need to be output.

The rotational speed $n_M$ which is adjusted by the Kalman filter 20 and is provided as an output variable is supplied as an estimated input variable $n_{M,K}$ in addition to the measured motor current $I_{M,m}$ to the ripple detection unit 10. This means that $n_{M,K}=n_M$. From the ripple in the measured motor current $I_{M,m}$ and the (estimated) rotational speed $n_{M,K}$, adjusted by the Kalman filter 20, as input variables, the ripple detection unit 10 determines the commutation times. This can be undertaken, for example, in a manner corresponding to DE 197 29 238 C1, which has already been mentioned. Furthermore, from the input variables, the ripple detection unit 10 derives an estimated rotational speed $n_{M,R}$ and an estimated motor angle of rotation $MP_{M,R}$ of the DC motor and provides these two output variables to the Kalman filter 20 as input variables, i.e. $n_{M,R}=n_{M,c}$ and $MP_{M,R}=MP_{M,c}$.

In other words, the output of the Kalman filter 20 and the ripple detection unit 10 are mutually adjusted for each calculation step by the computing unit. This leads to an optimized estimation of the motor angle of rotation $MP_M$ and rotational speed $n_M$ of the DC motor 1. The output variables of the rotational speed $n_M$ and the motor angle of rotation $MP_M$ that are provided by the Kalman filter can then be supplied to an evaluation unit, not illustrated in FIG. 1, for further processing.

Errors in the output due to output malfunctions or noise-afflicted observations are filtered out on the basis of a weighted average value of estimated and observed values of the input variables of the Kalman filter 20. The output variables of the Kalman filter are therefore optimal and are the greatest possible approximation to the actual state of the observed DC motor 1.

The depiction of the motor state model 21 that is provided in the Kalman filter 20 requires the load torque $M_{L,c}$ existing during operation of the DC motor 1. The causes of the load torque in the actual system arise from friction, rigidity and/or losses of the system, etc. and typically cannot be measured without sensors. The load torque $M_{L,c}$ is therefore estimated by the load estimation unit 30 from the measured motor current $I_{M,m}$ and the measured motor terminal voltage $U_{M,m}$ and from the motor parameters. Load estimation units of this kind are known to a person skilled in the art from the prior art and will therefore not be explained in detail further.

The ripple detection unit 10 permits an indirect observation or measurement of the motor rotational speed $n_{M,c}$ and the motor angle of rotation $MP_{M,c}$. For this purpose, the ripple detection unit 10 requires, as input variables, the measured motor current $I_{M,m}$ and the rotational speed $n_{M,K}=n_M$ adjusted by the Kalman filter 20. The output variables are then the angular speed (rotational speed) and the motor angles of rotation through which the motor shaft passes in accordance with the number of ripples in the commutator segments present in the DC motor. The procedure in this respect is described in DE 197 29 238 C1.

In order to optimize the detection of the position or angle of rotation of the DC motor 1 on the basis of the number of ripples, the ripple detection unit 10 expediently implements a procedure in which the motor rotational speed $n_{M,K}$ of the Kalman filter 20 is used as reference. This function is capable of precisely identifying commutation ripples if the ripples observed in the motor current wave shape are produced with a dominant frequency (as in the case of two-pole DC motors) and for two or more frequencies (as in the case of a four-pole motor or a motor which is a quadripole with an asymmetric magnetic field).

The advantage of the method on the basis of the Kalman filter consists in that the inaccuracies in the estimation of the rotational speed and angle of rotation by a motor model are adjusted by observation of the motor rotational speed and motor angle of rotation with the ripple detection unit, and vice versa. Such a procedure is more robust to changes in the motor parameters in comparison to the standard motor model known from the prior art. Furthermore, the necessity of more frequent updating of the motor parameters, in order to achieve a precise estimation, is greatly reduced. Moreover, better estimation of the rotational speed leads to a more precise calculation of the motor parameters which, in turn, can be used for improving other algorithms, such as rotational speed regulation or countertorques.

The invention claimed is:

1. A method for determining a rotational speed and an angle of rotation of a motor shaft of a mechanically commutated DC motor from a measured progression of time of a ripple in a motor current and in a motor terminal voltage occurring during commutation, comprising:
   supplying a Kalman filter, which comprises a motor state model of the DC motor, with a measured motor terminal voltage and a measured motor current, an estimated load torque, an estimated rotational speed and an estimated angle of rotation of the DC motor as input variables;
   providing, by the Kalman filter, by running the motor state model, an estimated current, an adjusted rotational speed and an adjusted angle of rotation of the DC motor as output variables;
   determining, by a ripple detection unit, from the ripple in the measured motor current and the rotational speed, adjusted by the Kalman filter, as input variables, commutation times and;
   deriving, from the latter, an estimated rotational speed and an estimated angle of rotation of the DC motor and providing the same to the Kalman filter as the input variables.

2. The method as claimed in claim 1, in which the rotational speed adjusted by the Kalman filter and the adjusted angle of rotation of the DC motor are supplied as output variables to an evaluation unit for further processing.

3. The method as claimed in claim 1, in which the Kalman filter compares one or more of the states estimated by the motor state model of current and/or adjusted rotational speed and/or adjusted angle of rotation of the DC motor with the values determined by measurement and estimation by the ripple detection unit and, when errors are ascertained, filters same by forming a weighted average value of estimated and observed values.

4. The method as claimed in claim 1, in which the estimated load torque is determined by a load estimation unit from the measured motor terminal voltage, the measured motor current and from motor parameters of the DC motor that are stored in the load estimation unit.

5. The method as claimed in claim 1, in which the ripple detection unit determines commutation times from the adjusted rotational speed provided by the Kalman filter and processes said times as a reference if the ripples observed in the wave shape of the measured motor current have a dominant frequency or if the ripples observed in the wave shape of the measured motor current have two or more ripple frequencies.

6. The method as claimed in claim 1, in which the Kalman filter, the ripple detection unit and the load estimation unit are implemented as programs and are executed by a computing unit.

7. A non transitory computer program product which can be directly loaded into an internal memory of a digital computing unit and comprises software code sections which are used to carry out the steps according to claim 1 when the product runs on the computing unit.

8. The method as claimed in claim 2, in which the Kalman filter compares one or more of the states estimated by the motor state model of current and/or adjusted rotational speed and/or adjusted angle of rotation of the DC motor with the values determined by measurement and estimation by the ripple detection unit and, when errors are ascertained, filters same by forming a weighted average value of estimated and observed values.

9. A device for determining a rotational speed and an angle of rotation of a motor shaft of a mechanically commutated DC motor from a measured progression of time of a ripple in the motor current and in a motor terminal voltage occurring during commutation, comprising:

a Kalman filter, which comprises a motor state model of the DC motor; and a ripple detection unit, wherein the Kalman filter is supplied with a measured motor terminal voltage and a measured motor current, an estimated load torque, an estimated rotational speed and an estimated angle of rotation of the DC motor as input variables, wherein, by running the motor state model, the Kalman filter provides an estimated current, an adjusted rotational speed and an adjusted angle of rotation of the DC motor as output variables; and wherein the ripple detection unit determines, from the ripple in the motor current and the rotational speed, adjusted by the Kalman filter, as input variables, the commutation times and, from the latter, derives an estimated rotational speed and an estimated angle of rotation of the DC motor and provides same to the Kalman filter as the input variables.

* * * * *